United States Patent
Kamata

(10) Patent No.: US 8,678,278 B2
(45) Date of Patent: *Mar. 25, 2014

(54) REMOVABLE-MEDIUM APPARATUS AND CONTROL METHOD THEREOF

(75) Inventor: Megumi Kamata, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 882 days.

This patent is subject to a terminal disclaimer.

(21) Appl. No.: 11/559,677

(22) Filed: Nov. 14, 2006

(65) Prior Publication Data

US 2007/0108272 A1 May 17, 2007

(30) Foreign Application Priority Data

Nov. 17, 2005 (JP) ................................. 2005-332418

(51) Int. Cl.
*G06K 5/00* (2006.01)
*G06F 17/00* (2006.01)
*G06F 12/00* (2006.01)
*G06F 21/00* (2013.01)

(52) U.S. Cl.
USPC ........... 235/382; 235/375; 235/380; 711/115; 713/182

(58) Field of Classification Search
USPC ............ 235/382, 375, 380; 711/115; 705/43; 713/182
See application file for complete search history.

(56) References Cited

U.S. PATENT DOCUMENTS

| | | | |
|---|---|---|---|
| 6,336,585 B1* | 1/2002 | Harada | 235/380 |
| 6,338,048 B1* | 1/2002 | Mori | 705/41 |
| 7,014,105 B2* | 3/2006 | Fujioka | 235/379 |
| 7,219,832 B2* | 5/2007 | Fillinger et al. | 235/379 |
| 7,336,788 B1 | 2/2008 | Hendricks | |
| 2002/0114461 A1 | 8/2002 | Shimada et al. | |
| 2002/0138754 A1 | 9/2002 | Himeno | |
| 2003/0167395 A1 | 9/2003 | Chang et al. | |
| 2004/0195315 A1* | 10/2004 | Workens | 235/380 |
| 2005/0278422 A1* | 12/2005 | Prust | 709/203 |
| 2006/0184806 A1* | 8/2006 | Luttmann et al. | 713/193 |
| 2006/0294104 A1 | 12/2006 | Morrison et al. | |
| 2007/0016800 A1* | 1/2007 | Spottswood et al. | 713/193 |

FOREIGN PATENT DOCUMENTS

| | | |
|---|---|---|
| CN | 1263305 A | 8/2000 |
| JP | 2003196241 A | 7/2003 |

OTHER PUBLICATIONS

State Intellectual Property Office, Notification of the First Office Action in Chinese Patent Appl'n No. 2006101485077 (counterpart to the above-captioned U.S. patent application) mailed May 23, 2008.

* cited by examiner

*Primary Examiner* — Michael G Lee
*Assistant Examiner* — Laura Gudorf
(74) *Attorney, Agent, or Firm* — Baker Botts L.L.P.

(57) ABSTRACT

A removable-medium apparatus that outputs data, which is stored on a removable medium that can be freely mounted or removed. The removable-medium apparatus comprises: a judgment unit that determines whether or not ID information that is entered matches ID information that is stored on the removable medium; and a control unit that outputs the data stored on the removable medium when the judgment unit determines that the entered ID information matches the ID information stored on the removable medium, and does not output the data stored on the removable medium when the judgment unit determines that the ID entered information does not match the ID information stored on the removable medium.

13 Claims, 7 Drawing Sheets

REMOVABLE-MEDIUM APPARATUS AND CONTROL METHOD THEREOF

CROSS-REFERENCE TO RELATED APPLICATIONS

The Nonprovisional application claims priority under 34 U.S.C. §119(a) on Patent Application No. 2005-332418 filed in Japan on Nov. 17, 2005, the entire contents of which are hereby incorporated by reference.

BACKGROUND

The present invention relates to a removable-medium apparatus and control method thereof, and more particularly to a removable-medium apparatus and control method thereof that are capable of preventing data stored on a removable medium from leaking over a network.

Data such as image data that was taken by a digital camera, or text that was created by a computer is stored on a memory card that can be freely mounted or removed (removable medium). That memory card is mounted in a card reader (removable-medium apparatus) that is connected to a network, and the data that is stored on the memory card is read and inputted to a computer that is also connected to the network.

However, in order to increase security when transmitting or receiving data over the network, the user must input a user name and password, and access is allowed only when the correct user name and password are inputted. Therefore, the user must correctly input the user name and password each time when accessing the data. In Japanese Patent Application Laid-Open No. 2003-196241, an apparatus is disclosed in which in order to improve the convenience of the work of inputting the user name and password, after the user name and password have been inputted one time, that information is stored on an IC card, and every time after that the apparatus uses the IC card to automatically set that information.

SUMMARY

However, in the case of a company network or the like where a plurality of computers and a card reader are connected to the network, when a user that uses one of the plurality of computers is able to access the card reader, it is possible for that user to read the data that is stored on a memory card. It is possible to set a password for the card reader so that only users that know the password can access the card reader, however, a user that knows the password to the card reader may not always be a user that is allowed to access the data that is stored on the memory card.

Therefore, there is a problem in that since there are different kinds of data such as information related to personnel, personal information and the like, all of the users that know the password to the card reader may access all of the data that is stored on a memory card that is mounted in the card reader, so there is a possibility that confidential information could be leaked.

An object of the present invention is to solve the aforementioned problem by providing a removable-medium apparatus and control method thereof that are capable of preventing leaking of data that is stored on a removable medium that is mounted in the removable-medium apparatus that is connected to a network.

In order to accomplish the object, a removable-medium apparatus in which a removable medium storing data and ID information for access is mounted, and which outputs the data stored on the removable medium, comprises: a judgment unit that determines whether or not ID information that is entered matches ID information that is stored on the removable medium; and a control unit that outputs the data stored on the removable medium when the judgment unit determines that the entered ID information matches the ID information stored on the removable medium, and does not output the data stored on the removable medium when the judgment unit determines that the entered ID information does not match the ID information stored on the removable medium.

Since this invention determines whether or not ID information that is entered matches ID information that is stored on a removable medium; and outputs the data stored on the removable medium when it is determined that the entered ID information matches the ID information stored on the removable medium, and does not output the data stored on the removable medium when it is determined that the entered ID information does not match the ID information stored on the removable medium, it is only possible for a person who knows the ID information for the removable medium to obtain the data stored on that removable medium, so it is possible to prevent leaking of confidential information.

The above and further objects and features of the invention will be more fully apparent from the following detailed description with accompanying drawings.

DETAILED DESCRIPTION OF THE EXEMPLARY EMBODIMENTS

Figure 1:
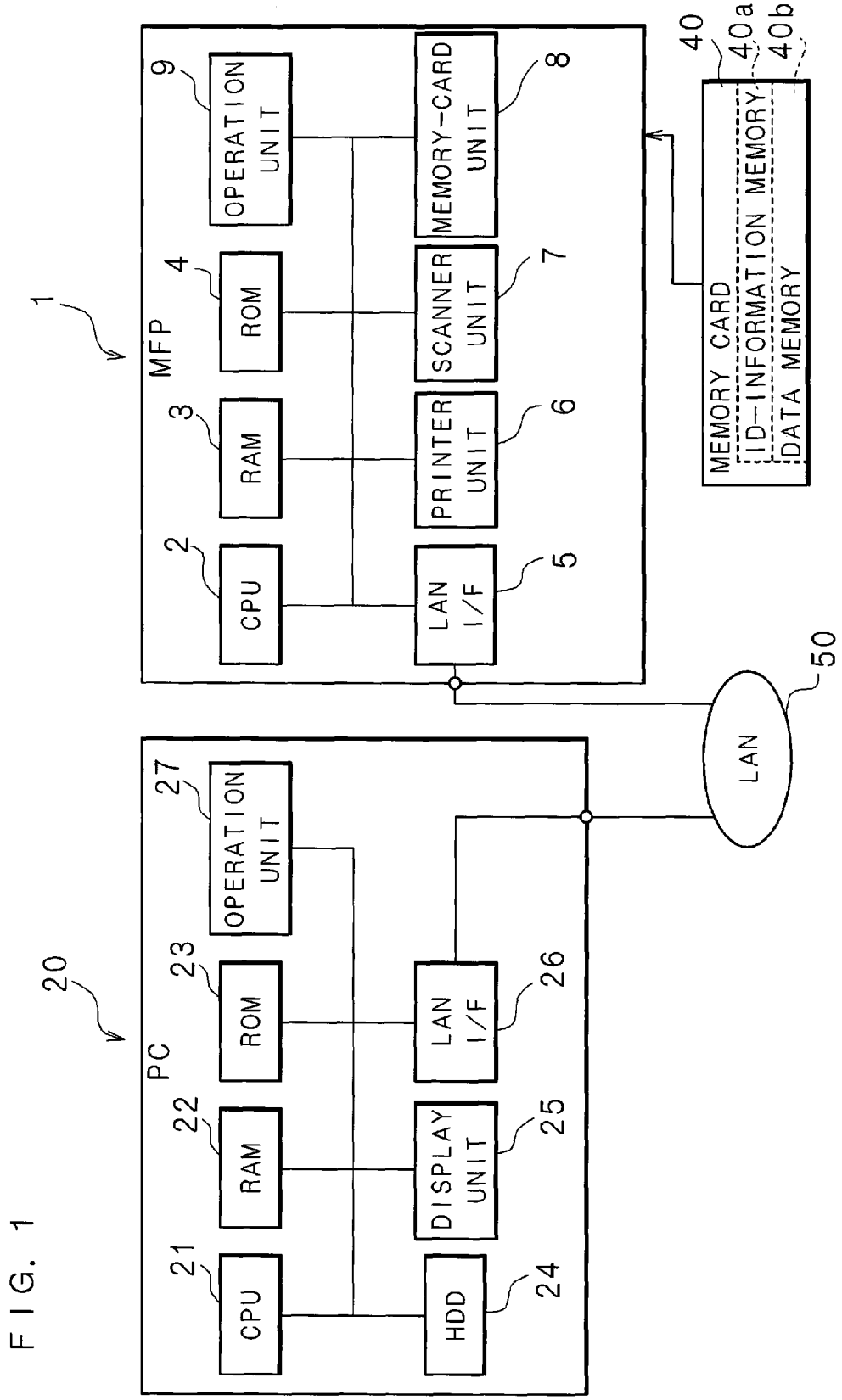
FIG. 1 is a block diagram showing the construction of a communication system that includes a multi-function peripheral apparatus.

The present invention will be described below based on drawings that show the preferred embodiments. FIG. 1 is a block diagram showing the construction of a communication system comprising a multi-function peripheral apparatus (hereafter referred to as MFP) 1, and a personal computer (hereafter referred to as PC) 20 that are connected via a local area network (LAN) 50.

The MFP 1 comprises various functions such as a memory-card-read/write function, printer function, copy function, scanner function and the like in one unit. As shown in FIG. 1, the MFP 1 comprises mainly: a CPU 2 that controls all of the operations of the MFP 1; RAM 3, which is a memory for temporarily storing data and programs necessary for the various processings that are executed by the CPU 2; ROM 4 that stores various control programs that are executed by the CPU 2 and fixed-value data; an LAN interface (hereafter abbreviated as LAN I/F) 5; a printer unit 6; a scanner unit 7; a memory-card unit 8; and an operation unit 9 having a plurality of operation-input keys (buttons, switches, etc.) for making the MFP 1 execute various functions.

The CPU 2 is a processor that executes various programs that are stored in the ROM 4. The RAM 3 is a random access memory that has a work area for temporarily storing variables when the CPU 2 executes various programs.

The operation unit 9 comprises a plurality of switches and a display on a control panel, and the user sends instructions to the MFP 1 by operating the switches. The display displays setting screens for setting various values, and displays the set values. When ID information that includes a user name and password is not stored in an ID-information memory 40*a* on a memory card 40 that is mounted in the memory-card unit 8, it is possible to write a new user name and password by operating the switches, and when a user name and password are already stored, it is possible to use the switches to change that user name and password.

The LAN I/F 5 is an interface with the LAN 50 network. In this embodiment, FTP (File Transfer Protocol) is used to perform communication. Therefore, the MFP 1 functions as an FTP server. The printer unit 6 is an ink-jet type printer for printing on paper that is set in a specified paper-supply position (not shown in the figure) according to an instruction from the CPU 2, and comprises: a paper-feed motor (not shown in the figure) that feeds the paper, a printing head (not shown in the figure) that sprays ink on the paper, and a carriage motor (not shown in the figure) that moves a carriage (not shown in the figure) in which the printing head is mounted.

The scanner unit 7 reads an image from an original document that is set at a specified reading position (not shown in the figure) according to instruction from the CPU 2, and creates image data for that image. The image data that is read by the scanner unit 7 is sent to the PC 20 via the LAN 50.

Also, when the MFP 1 is set to the copy mode that activates the copy function of the MFP 1, the printer unit 6 prints image data that is created by the scanner unit 7 on the paper. Furthermore, when the MFP 1 is set to the scanner mode that activates the scanner function of the MFP 1, the image data that is created by the scanner unit 7 is stored in a specified memory space in the RAM 3.

The memory-card unit 8 comprises a slot in which it is possible to freely mount or remove various kinds of memory cards 40, and it reads data that is stored on a memory card 40 that is mounted in the slot, or writes data to it. The data that is read from the memory card 40 can be sent to the PC 20 via the LAN 50. Also, by operating the MFP 1, the memory-card unit 8 has a function for writing ID information to the ID information memory 40*a* of the memory card 40, or a function for writing specified data from the PC 20 via the LAN 50 to a data memory 40*b*.

The memory card 40 has a flash memory which can be written over, and that retains stored data even when the power is cut, with various types made by various companies being available. This memory card 40 comprises: the ID-information memory 40*a* that stores ID information that includes the user name and password; and the data memory 40*b* that stores data such as image data or text data. When a memory card 40 is mounted in the memory-card unit 8, or when a memory card 40 is already mounted when the power is turned ON, the memory-card unit 8 detects whether or not ID information has been stored in the ID information memory 40*a*, and when ID information has been stored, stores that ID information in a specified area in the RAM 3.

When accessing data that is stored in the data memory 40*b* from the PC 20 via the LAN 50, ID information is entered at the PC 20 and the MFP 1 receives that ID information and performs authentication to determine whether or not that ID information matches the ID information that is stored in the specified space in the RAM 3. When as a result of the authentication performed it is determined that both the user name and password match, sending the data that is stored in the data memory 40 to the PC 20 is allowed; however, when it is determined that the user name or password does not match, the data is not sent to the PC 20. When ID information is not stored in the ID-information memory 40*a*, it is possible to obtain the data that is stored in the data memory 40*b*.

Next, an explanation about the PC 20 is given. The PC 20 comprises: a CPU 21; RAM 22, which is a memory for temporarily storing required data and programs for the various processings executed by the CPU 21; ROM 23 that stores various control programs that are executed by the CPU 21 and fixed-value data; a rewritable non-volatile hard disk (HDD) 24 that stores various settings; an operation unit 27 having a keyboard with a plurality of operation-input keys for setting various functions and a mouse; a display unit 25 having a liquid-crystal display that displays various information; and an LAN I/F 26 that is an LAN interface for connecting to the LAN 50.

In addition to the OS (Operating System), various application programs are installed on the hard disk 24. One of the application programs is a browser, and with this browser it is possible to access a memory card 40 that is mounted in the memory-card unit 8 of the MFP 1 that functions as an FTP server, and to perform processing for acquiring data that is stored on the memory card 40.

Figure 2:
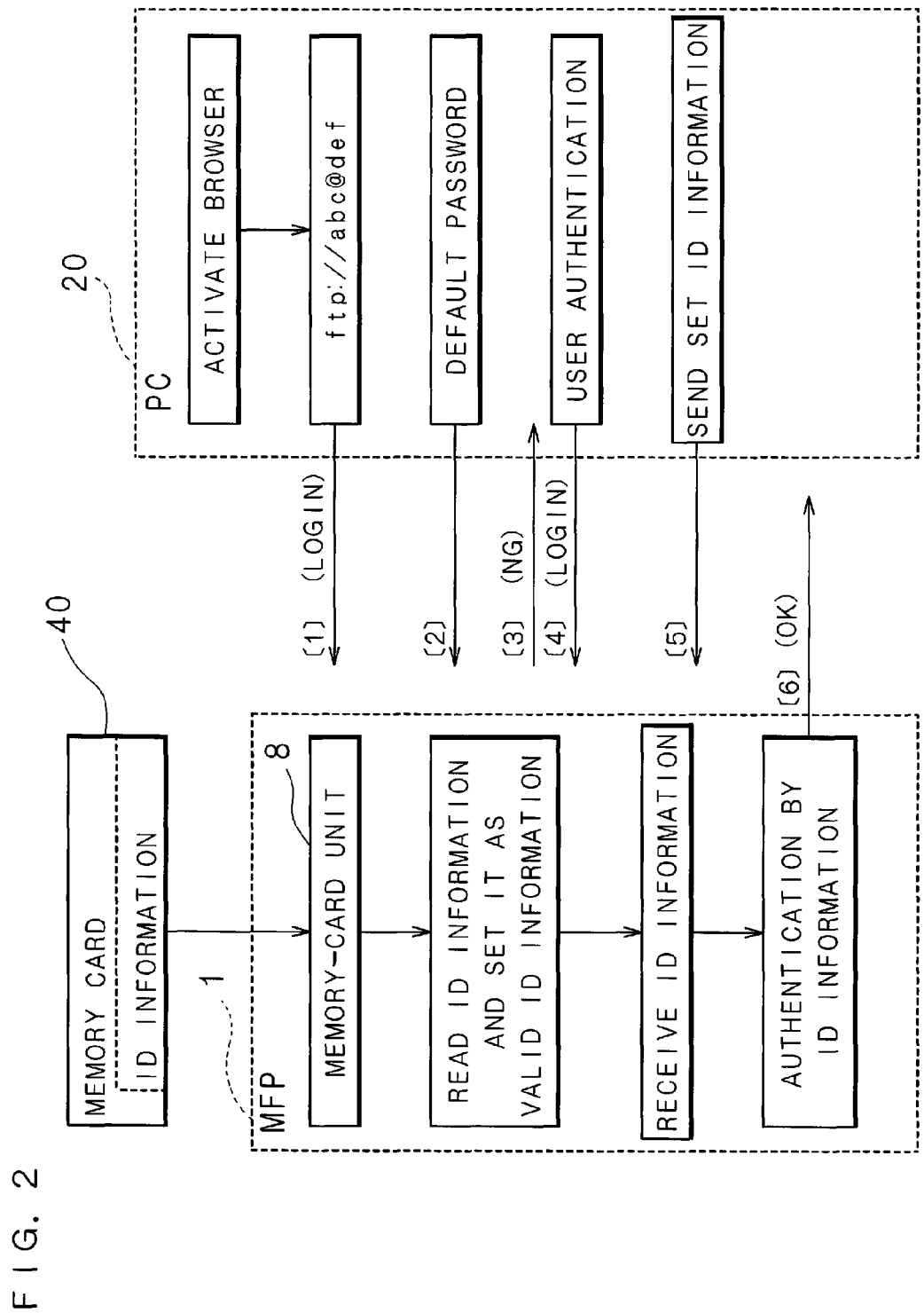
FIG. 2 is a drawing showing the processing that is executed by a multi-function peripheral apparatus and personal computer.

Next, the processing performed by the MFP 1 and PC 20 will be explained with reference to FIG. 2. FIG. 2 is a drawing showing the processing that is executed by the MFP 1 and PC 20.

First, a memory card 40 is mounted in the memory-card unit 8 of the MFP 1, and the ID information that is stored on the memory card 40 is read and valid ID information is stored in the RAM 3. Next, the browser on the PC 20 is activated by user's operation, and the browser requests login to the MFP 1. Here, the user name is 'abc', and 'def' after the '@' mark is the node name [1], at the same time, a default password is sent to the MFP 1 [2] (during the first login, the browser is set to send a preset default password).

When the MFP 1 receives this user name and default password, it determines whether or not they match the valid user name and password that are stored in the RAM 3. The default password does not match the valid password, so the MFP 1 returns information (NG) to the PC 20 indicating that the password is not correct.

The browser is such that when it receives the information (NG) indicating the incorrect password, it displays a screen (see FIG. 6) for inputting the user name and password. When the user sets the user name and password on this screen, a login request is performed again [4], and the set user name and password are sent to the MFP 1 [5].

The MFP 1 determines whether or not the newly received user name and password match the valid user name and password, and when they match, it notifies the PC 20 that authentication is successful, and after that sends the data that is stored on the memory card 40 according to requests from the PC 20.

Figure 3A:
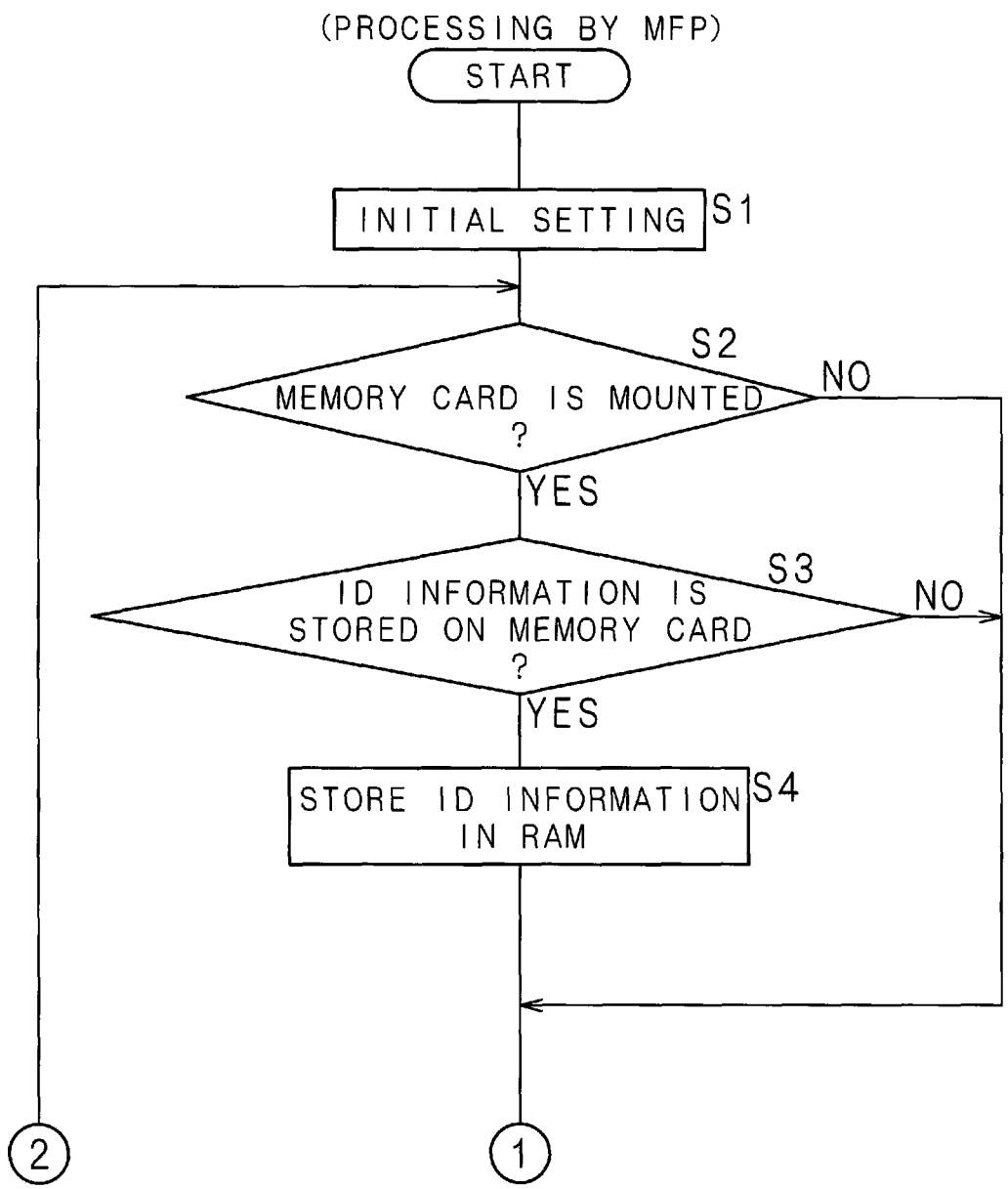
FIGS. 3A and 3B are flowcharts showing the processing by a multi-function peripheral apparatus.
Figure 3B:
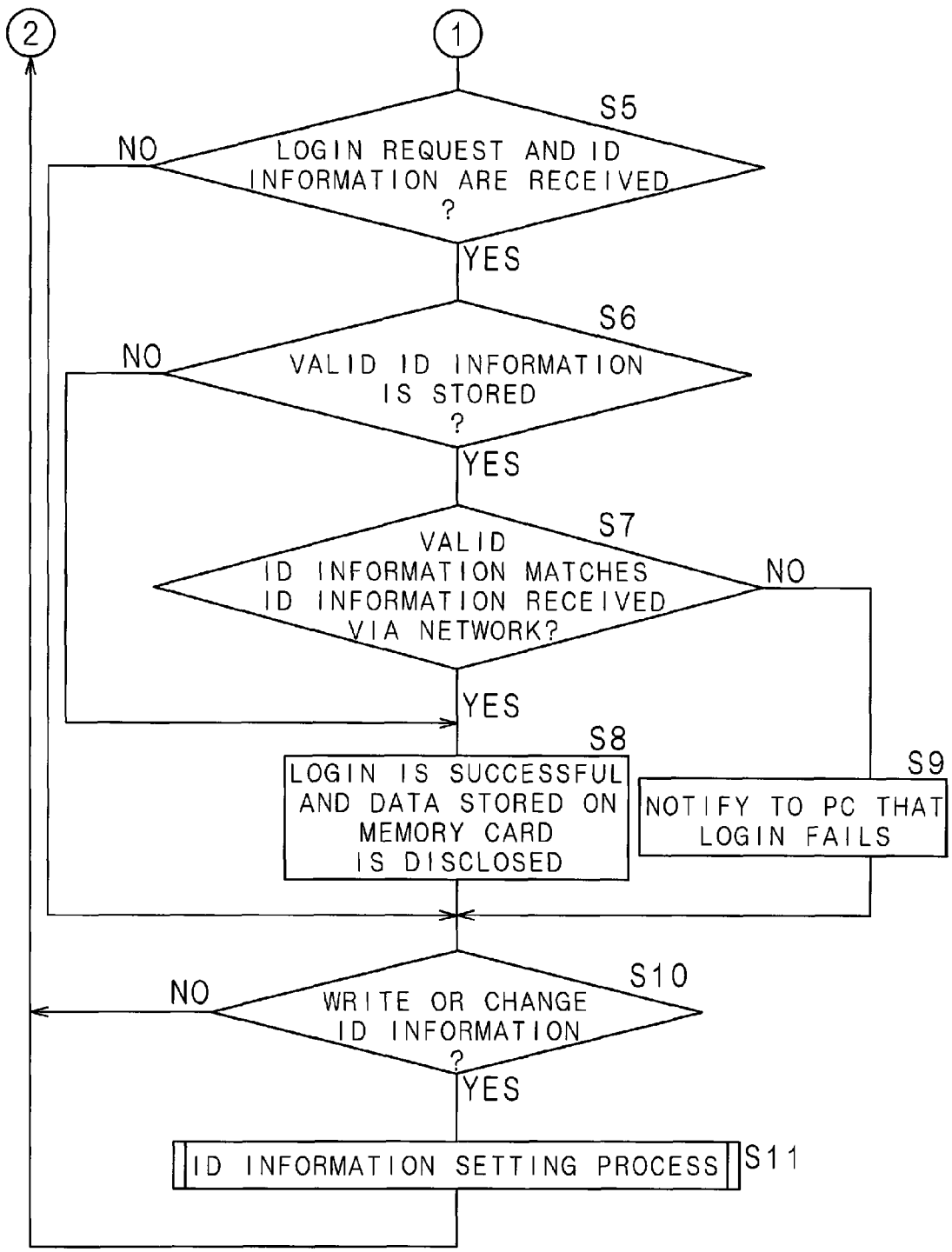
Figure 4:
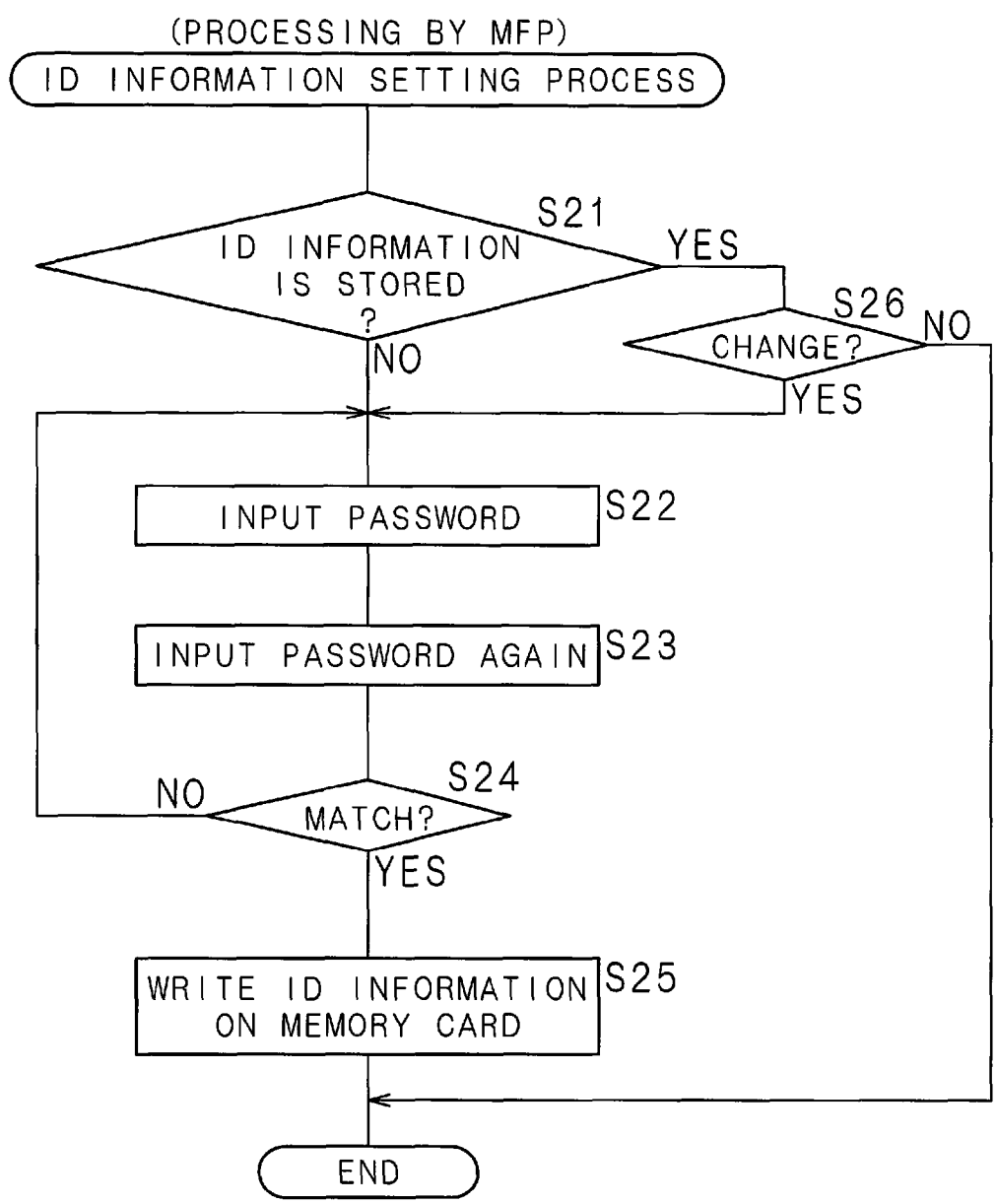
FIG. 4 is a flowchart showing the process of setting or changing ID information in a multi-function peripheral apparatus.

Next, the processing that is performed by the MFP 1 will be explained with reference to FIGS. 3A, 3B and FIG. 4. First, FIGS. 3A, 3B are flowcharts showing the main processing that is performed by the MFP 1. This main processing is activated when the power to the MFP 1 is turned ON, and is executed until the power is turned OFF. In this flowchart, only the processing for the card reader is shown.

In this processing, first, initial setting is performed (S1). In this initial setting, the MFP 1 sets the area in the RAM 3 where the valid user name and password are to be stored, and sets that area as not containing a valid user name and password. Next, the MFP 1 determines whether or not a memory card 40 is mounted in the memory-card unit 8 (S2).

When a memory card 40 is mounted (S2: YES), the MFP 1 determines whether or not ID information is stored on the memory card 40 (S3). When ID information is stored on the memory card 40 (S3: YES), the MFP 1 reads that ID information, and stores that ID information in the area set in the RAM 3 for storing the valid user name and password (S4). When a memory card 40 is mounted before the power to the MFP 1 is turned ON, then when the power to the MFP 1 is turned ON and there is a user name and password stored on the memory card 40, the MFP 1 reads that user name and password and stores them in the RAM 3.

When it is determined in the judgment process of step S2 that a memory card 40 is not mounted (S2: NO), when it is determined in the judgment process of step S3 that there is no ID information stored on the memory card 40 (S3: NO), or when the processing of step S4 has ended, the MFP 1 then determines whether or not a login request and ID information have been received from the PC 20 via the network (LAN 50) (S5). When a login request and ID information have been received (S5: YES), the MFP 1 determines whether or not ID information is stored in the area of the RAM 3 for storing ID information (S6), and when valid ID information is stored (S6: YES), it determines whether or not the valid user name and password match the received user name and password (S7).

When the valid user name and password match the received user name and password (S7: YES), or in the judgment process of step S6 when a valid user name and password are not stored in the RAM 3 (S6: NO), the MFP 1 determines that login is successful and enables communication with the PC 20, and when there is a request from the PC 20 to send data that is stored on the memory card 40, the MFP 1 sends that data to the PC 20 via the network (LAN 50) (S8).

On the other hand, in the judgment process of step S7, when the valid user name and password do not match the received user name and password (S7: NO), the MFP 1 sends information indicating that login fails (NG) to the PC 20 via the network (LAN 50) (S9).

In the judgment process of step S5, when neither a login request nor ID information are received (S5: NO), or when the processing of step S8 or S9 has ended, the MFP 1 determines whether or not an instruction to write ID information to the memory card 40, or an instruction to change the user name and password stored on the memory card 40 has been given (S10). When the instruction has been given (S10: YES), the MFP 1 performs the ID information setting process (described later) (S11), however, when the instruction has not been given (S10: NO), the procedure is returned to the processing of step S2. When the memory card 40 is removed, information indicating that valid ID information is not stored in the ID-information memory 40a is stored in the RAM 3. By doing so, NO-judgment is performed at step S6 and empty information of memory card 40 is disclosed at step S8.

Next, the ID information setting process of step S11 in the flowchart shown in FIG. 3B will be explained with reference to FIG. 4. This ID information setting process is a process performed by the MFP 1 to write ID information in the ID-information memory 40a on the memory card 40, or to change ID information. FIG. 4 is a flowchart showing the ID-information-setting process.

First, the MFP 1 determines whether or not valid ID information is already stored in the ID-information memory 40a on the memory card 40 (S21). When ID information is not stored (S21: NO), a screen is displayed for the user to input ID information, and the MFP 1 waits for the user input. When the user inputs a user name and password, the inputted user name and password are entered (S22), then in order to confirm the input, the user is requested to input the password again. After the user inputs the password again, that password is entered (S23). Next, the MFP 1 determines whether or not the password entered in the process of step S22 matches the password that is re-entered in the process of step S23 (S24).

When these passwords match (S24: YES), the MFP 1 determines that the password is correct and writes that password and user name to the ID-information memory 40 on the memory card 40 (S25) and ends the password-input process. However, when these passwords do not match (S24: NO), the procedure is returned to the processing of step S22. On the other hand, in the judgment process of step S21, when it is determined that a valid user name and password are already stored in the ID-information memory 40a (S21: YES), a screen is displayed (not shown in the figure) for the user to select whether or not to change the password, and the MFP 1 determines whether or not the user gives an instruction to change the password (S26).

When there is an instruction to change the password (S26: YES), the procedure advances to the processing of step S22. However, when there is no instruction to change the password (S26: NO), this password-input process ends. In the judgment process of step S26, when there is an instruction from the user to change the user name and password, a screen is displayed for inputting the current user name and password, and when the user inputs the correct user name and password, the procedure advances to the processing of step S22, however, when the user does not input the correct user name and password, it is possible to not perform the process of changing the password.

As described above, when a user name and password are not stored on the memory card 40, the user can set the user name and password, and when a user name and password are already stored, the user can change that user name and password. To change the user name or password, it is possible to make changes after the current user name and password have been inputted correctly, however, when the current user name and password are not inputted correctly, changes cannot be made, so in this way it is possible to prevent the user name and password from being changed improperly.

Figure 5:
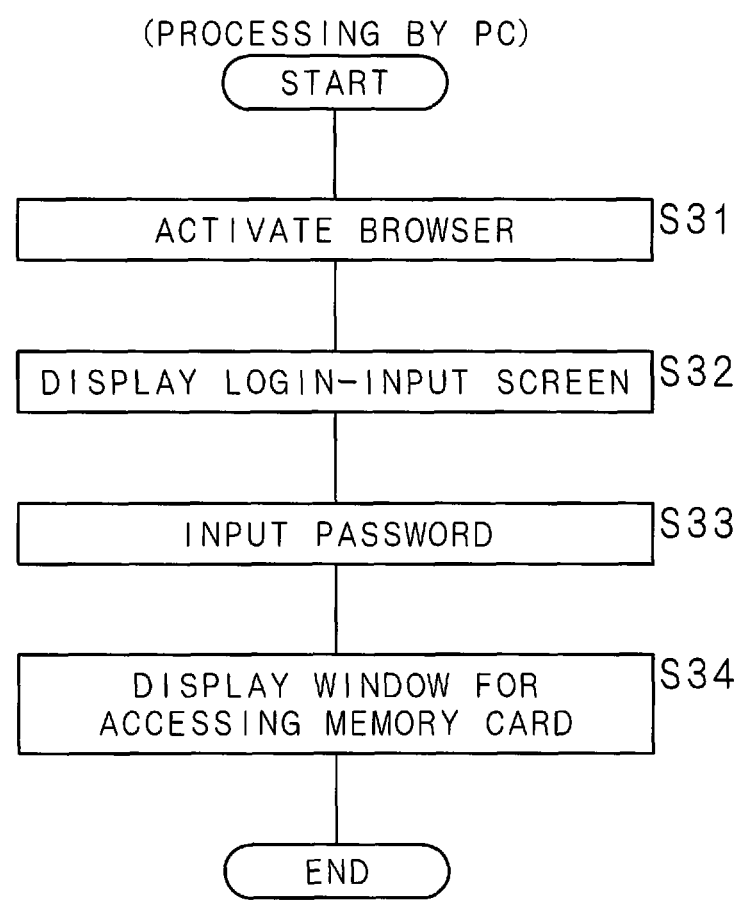
FIG. 5 is a flowchart showing the processing by a personal computer.

Next, the login process in the PC 20 will be explained with reference to FIG. 5 and FIG. 6. FIG. 5 is a flowchart showing the processing by the PC 20, and FIG. 6 is a drawing showing the login-input screen that is displayed on the display unit 25 of the PC 20.

When a memory card 40 is mounted in the memory-card unit 8 of the MFP 1, a browser is activated by the PC 20 for accessing that memory card 40 (S31). After the browser has been activated, the user name and default password that are already set in the PC 20 are sent to the MFP 1.

When a valid password is stored on the memory card 40, the default password will not match the valid password, so information indicating that login fails will be sent from the MFP 1 to the PC 20.

Figure 6:
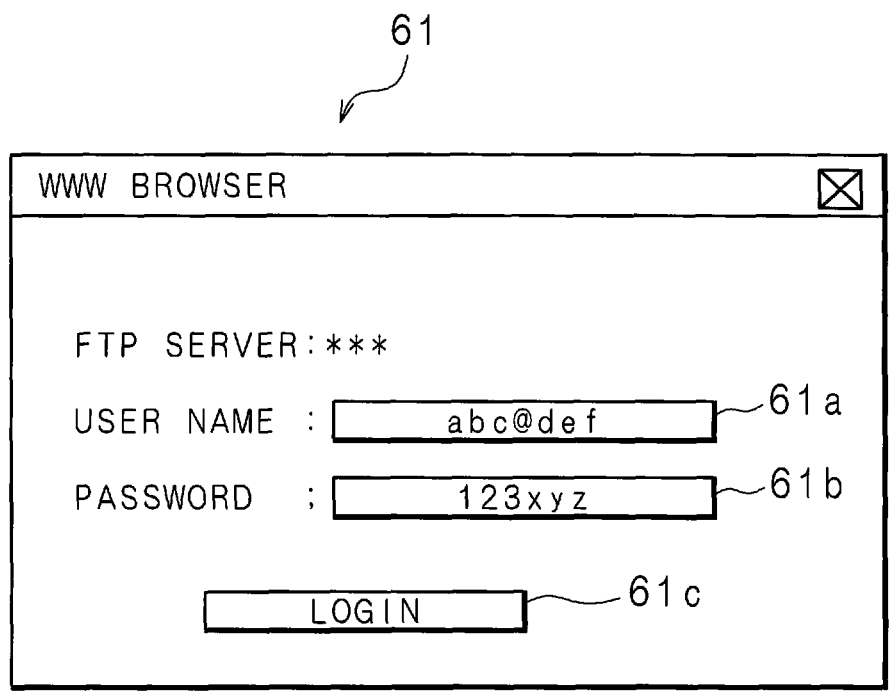
FIG. 6 is a drawing showing the login-input screen of a personal computer.

After the PC 20 receives the information indicating that login fails, a login-input screen as shown in FIG. 6 for the user to input the user name and password is displayed (S32). Normally, a user name is registered for the PC 20, so that user name will be automatically displayed and the user only has to input a password.

After the password is inputted (S33), the PC 20 sends a login request along with the user name and password to the MFP 1. When that password is the correct password, information indicating that login is successful is sent from the MFP 1, and the PC 20 displays a window for accessing the memory card (S34) and waits for an instruction from the user.

FIG. 6 is a drawing showing the login-input screen 61, and it is displayed when, as described above, information indicating that login from the PC 20 fails is received. This login-input screen comprises a box 61a for inputting the user name, a box 61b for inputting the password, and a login button 61c for giving an instruction to perform the login process.

Normally, a preset user name is automatically set in the box 61a for inputting the user name, however, when necessary, it is possible to use the mouse to place the cursor inside the box 61a and change the user name. The password is inputted into the box 61b for inputting the password by placing the cursor in the box 61b and using the keyboard to input the password. Here, an example of using a combination of number and alphabetic letters '123xyz' is used, however, the characters displayed in the box 61b will be displayed as '******' so that they are discernable by another person. By clicking on the login button 61c after the user name and password have been inputted as described above, a login request is issued to the MFP 1 from the PC 20.

As explained using the embodiment described above, when a password is stored on a memory card 40, the MFP 1 sets that password as a valid password, and determines whether or not the password that is received from the PC 20 at the same time as the login request matches the valid password, and when it matches, regards login as being successful and sends the data stored on the memory card 40 to the PC 20. On the other hand, when the received password does not match the valid password, it regards login as having failed and notifies the PC 20.

Also, when a valid password is not stored on the memory card 40 and there is a login request, the login is regarded as being successful regardless of the password, and the MFP 1 sends the data stored on the memory card 40 to the PC 20.

Therefore, when there is a valid password stored on a memory card 40, only a person that inputs the correct password from the PC 20 can obtain the data that is stored on the memory card 40. Also, when a password is not stored on the memory card 40, it is possible to obtain the data stored on the memory card 40 regardless of the password. Therefore, when the data that is stored on the memory card 40 is not confidential, it is not necessary to store ID information on the memory card 40, and when obtaining the data stored on the memory card 40 via the LAN 50, it is not necessary to input a password, so it is convenient.

The present invention is explained based on the embodiment described above, however the invention is not limited to the embodiment above, and as can be easily imagined, the embodiment can be modified or changed within the range of the invention.

For example, in the embodiment described above, a password is stored on a removable medium, and when a password that is entered via a network matches the password stored on the removable medium, the data that is stored on the removable medium is outputted via the network, however when a password that is entered via the network does not match the password stored on the removable medium, the data that is stored on the removable medium is not outputted via the network. Compared with this, it is also possible that in the case where a plurality of items of data and ID information for each item of data is stored on the removable medium, when ID information that is entered via the network matches the ID information for any one of the items of ID information, the data corresponding to that ID information is outputted via the network, and when it is determined that the ID information that is entered via the network does not match any of the items of ID information stored on the removable medium, none of the data stored on the removable medium is outputted via the network. In this case, each of the items of data can be stored in a folder or file.

Also, in the embodiment described above, the card reader is presumed to be installed in the MFP 1, however, it is also possible for the card reader to have just a card reader or card reader/writer function.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A multi-functional peripheral apparatus, in which a removable medium storing data and ID information for access is mounted, and which outputs the data stored on said removable medium via a network, comprising:
    an input port that inputs data from an outer device via said network;
    an output port that outputs data to said outer device via said network;
    a detection unit that detects whether or not there is ID information stored on said removable medium;
    a judgment unit that determines whether or not ID information that is entered from said outer device via said input port matches the ID information that is stored on said removable medium, when said detection unit detects that there is ID information stored on said removable medium; and
    a control unit that is configured to:
        output the data stored on said removable medium to said outer device via said output port when said detection unit detects that there is no ID information stored on said removable medium,
        output the data stored on said removable medium to said outer device via said output port when said detection unit detects that ID information is stored on said removable medium and said judgment unit determines that the ID information entered via said input port matches the ID information stored on said removable medium, and
        not output the data stored on said removable medium to said outer device via said output port when said detection unit detects that ID information is stored on said removable medium and said judgment unit determines that the ID information entered via said input port does not match the ID information stored on said removable medium.

2. The multi-functional peripheral apparatus of claim 1, wherein
    a communication protocol of said network that outputs data stored on said removable medium is FTP.

3. The multi-functional peripheral apparatus of claim 1, further comprising:
    an accepting unit that accepts an input of ID information; and
    a write unit that writes the ID information inputted via said accepting unit on said removable medium.

4. The multi-functional peripheral apparatus of claim 3, wherein
a communication protocol of said network that outputs data stored on said removable medium is FTP.

5. A multi-functional peripheral apparatus, in which a removable medium storing data and ID information for access is mounted, and which outputs the data stored on said removable medium via a network, comprising:
an input port that inputs data from an outer device via said network;
an output port that outputs data to said outer device via said network;
a judgment unit that determines whether or not ID information that is entered from said outer device via said input port matches an item of ID information of a plurality of items of ID information that is stored on said removable medium, wherein said removable medium stores a plurality of items of data, and each of the plurality of items of ID information corresponds to at least one item of data of the plurality of items of data;
a control unit that is configured to:
output the at least one item of data that is stored on said removable medium and corresponds to the item of ID information to said outer device via said output port when said judgment unit determines that the ID information entered via said input port matches the item of ID information stored on said removable medium, and
not output the at least one item of data that is stored on said removable medium and corresponds to the item of ID information to said outer device via said output port when said judgment unit determines that the ID information entered via said input port does not match the item of ID information stored on said removable medium.

6. The multi-functional peripheral apparatus of claim 5, further comprising:
a detection unit that detects whether or not there is ID information stored on said removable medium that corresponds to data stored on said removable medium; wherein
said control unit is configured to output the data that corresponds to said ID information via said output port when said judgment unit determines that the ID information entered via said input port matches the ID data stored on said removable medium that corresponds to data stored on said removable medium, or when said detection unit detects that there is no ID information stored on the removable medium that corresponds to the data stored on said removable medium, and is configured not to output data that corresponds to said ID information via said output port when said detection unit detects that there is ID information stored on said removable medium that corresponds to data stored on said removable medium and said judgment unit determines that the ID information entered via said input port does not match the ID information stored on said removable medium that corresponds to data stored on said removable medium.

7. The multi-functional peripheral apparatus, of claim 5, wherein
a communication protocol of said network that outputs data stored on said removable medium is FTP.

8. The multi-functional peripheral apparatus, of claim 5, further comprising:
an accepting unit that accepts an input of ID information; and
a write unit that writes the ID information inputted via said accepting unit on said removable medium.

9. The multi-functional peripheral apparatus, of claim 8, wherein
a communication protocol of said network that outputs data stored on said removable medium is FTP.

10. A non-transitory computer-readable storage medium encoded with a computer program for realizing control of a multi-functional peripheral apparatus, in which a removable medium storing data and ID information for access is mounted, and which outputs the data stored on said removable medium via a network, the computer program causes the multi-functional peripheral apparatus to perform steps comprising:
inputting data from an outer device via said network;
outputting data to said outer device via said network;
detecting whether or not ID information is stored on said removable medium;
determining whether or not ID information entered from said outer device via an input port matches the ID information that is stored on said removable medium, when it is detected that ID information is stored on said removable medium; and
performing control, such that:
the data stored on said removable medium is output to said outer device via said output port when no ID information is detected to be stored on said removable medium,
the data stored on said removable medium is output to said outer device via said output port when ID information is detected to be stored on said removable medium and the ID information entered via said input port is determined to match the ID information stored on said removable medium, and
the data stored on said removable medium is not output to said outer device via said output port when ID information is detected to be stored on said removable medium and the ID information entered via said input port is determined not to match the ID information stored on said removable medium.

11. A multi-functional peripheral apparatus, in which a removable medium storing data and ID information for access is mounted, and which outputs the data stored on said removable medium via a network, comprising:
an input port that inputs data from an outer device via said network;
an output port that outputs data to said outer device via said network;
detecting means for detecting whether or not there is ID information stored on said removable medium;
judging means for determining whether or not ID information that is entered from said outer device via said input port matches the ID information that is stored on said removable medium, when said detecting means detects that there is ID information stored on said removable medium; and
control means for:
outputting the data stored on said removable medium to said outer device via said output port when said detecting means detects that there is no ID information stored on said removable medium,
outputting the data stored on said removable medium to said outer device via said output port when said detecting means detects that ID information is stored on said removable medium and said judging means determines that the ID information entered via said input port matches the ID information stored on said removable medium, and not outputting the data stored on said removable medium to said outer device via said output port when said detecting means detects that ID information is stored on said removable medium and said judging means determines that the ID information entered via said input port does not match the ID information stored on said removable medium.

12. A non-transitory computer-readable storage medium encoded with a computer program for realizing control of a multi-functional peripheral apparatus, in which a removable medium storing a plurality of items of data and a plurality of items of ID information for access is mounted, each of which items of ID information corresponds to at least one item of data, and which outputs the data stored on said removable medium via a network, the computer program causes the multi-functional peripheral apparatus to perform steps comprising:

inputting data from an outer device via said network;
outputting data to said outer device via said network;
detecting whether or not ID information is stored on said removable medium;
determining whether or not ID information entered from said outer device via an input port matches the ID information that is stored on said removable medium, when it is detected that ID information is stored on said removable medium; and
performing control, such that:
the data stored on said removable medium is output to said outer device via said output port when no ID information is detected to be stored on said removable medium,
the data stored on said removable medium is output to said outer device via said output port when ID information is detected to be stored on said removable medium and the ID information entered via said input port is determined to match the ID information stored on said removable medium, and
the data stored on said removable medium is not output to said outer device via said output port when ID information is detected to be stored on said removable medium and the ID information entered via said input port is determined not to match the ID information stored on said removable medium.

13. A multi-functional peripheral apparatus, in which a removable medium storing data and ID information for access is mounted, and which outputs the data stored on said removable medium via a network, comprising:

an input port that inputs data from an outer device via said network;
an output port that outputs data to said outer device via said network;
detecting means for detecting whether or not there is ID information stored on said removable medium;
judging means for determining whether or not ID information that is entered from said outer device via said input port matches ID information that is stored on said removable medium, when said detecting means detects that there is ID information stored on said removable medium; and
control means for:
outputting the data stored on said removable medium to said outer device via said output port when said detecting means detects that there is no ID information stored on said removable medium,
outputting the data stored on said removable medium to said outer device via said output port when said detecting means detects that ID information is stored on said removable medium and said judging means determines that the ID information entered via said input port matches the ID information stored on said removable medium, and
not outputting the data stored on said removable medium to said outer device via said output port when said detecting means detects that ID information is stored on said removable medium and said judging means determines that the ID information entered via said input port does not match the ID information stored on said removable medium.

* * * * *